United States Patent
Kishii et al.

(10) Patent No.: US 9,246,147 B2
(45) Date of Patent: Jan. 26, 2016

(54) BATTERY RETAINMENT BLOCK AND BATTERY MODULE

(75) Inventors: Daisuke Kishii, Osaka (JP); Shinya Geshi, Osaka (JP); Oose Okutani, Hyogo (JP); Toshiki Itoi, Nara (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 92 days.

(21) Appl. No.: 14/233,144

(22) PCT Filed: Jul. 26, 2012

(86) PCT No.: PCT/JP2012/004778
§ 371 (c)(1),
(2), (4) Date: Jan. 15, 2014

(87) PCT Pub. No.: WO2013/018331
PCT Pub. Date: Feb. 7, 2013

(65) Prior Publication Data
US 2014/0154545 A1  Jun. 5, 2014

(30) Foreign Application Priority Data
Jul. 29, 2011  (JP) .................. 2011-166588

(51) Int. Cl.
H01M 2/10       (2006.01)
H01M 10/625    (2014.01)
H01M 10/6557   (2014.01)
H01M 10/643    (2014.01)
H01M 10/6561   (2014.01)
H01M 10/613    (2014.01)
H01M 2/20       (2006.01)

(52) U.S. Cl.
CPC .......... *H01M 2/1077* (2013.01); *H01M 10/613* (2015.04); *H01M 10/625* (2015.04); *H01M 10/643* (2015.04); *H01M 10/6557* (2015.04); *H01M 10/6561* (2015.04); *H01M 2/206* (2013.01)

(58) Field of Classification Search
None
See application file for complete search history.

(56) References Cited

U.S. PATENT DOCUMENTS

| 5,034,290 A | 7/1991 | Sands et al. | |
| 6,379,837 B1 * | 4/2002 | Takahashi et al. | 429/151 |
| 2003/0017383 A1 * | 1/2003 | Ura et al. | 429/120 |

(Continued)

FOREIGN PATENT DOCUMENTS

| JP | 05-090816 U | 12/1993 |
| JP | 02-500396 A | 2/1996 |

(Continued)

OTHER PUBLICATIONS

Extended European Search Report dated Dec. 1, 2014 issued in European Patent Application No. 12819248.1.

(Continued)

*Primary Examiner* — Gregg Cantelmo
(74) *Attorney, Agent, or Firm* — McDermott Will & Emery LLP (57) ABSTRACT

A battery retainment block includes a plurality of block pieces each having a battery storage unit for retaining a battery. The plurality of block pieces are aligned and, among the plurality of block pieces, two block pieces that are adjacent to each other are coupled together. A gap is provided between the two block pieces that are adjacent to each other to serve as a circulation space for circulating a medium.

6 Claims, 7 Drawing Sheets

(56) References Cited

U.S. PATENT DOCUMENTS

| | | | |
|---|---|---|---|
| 2008/0305388 A1* | 12/2008 | Haussman | 429/120 |
| 2010/0092849 A1* | 4/2010 | Wood et al. | 429/99 |
| 2011/0151304 A1 | 6/2011 | Joswig et al. | |

FOREIGN PATENT DOCUMENTS

| | | | |
|---|---|---|---|
| JP | 2005-285455 A | 10/2005 | |
| JP | 2007-066773 A | 3/2007 | |
| JP | 2009-211908 A | 9/2009 | |
| JP | 2011-076841 A | 4/2011 | |

OTHER PUBLICATIONS

International Search Report issued in International Application No. PCT/JP2012/004778 with Date of mailing Oct. 16, 2012, with English Translation.

* cited by examiner

BATTERY RETAINMENT BLOCK AND BATTERY MODULE

RELATED APPLICATIONS

This application is the U.S. National Phase under 35 U.S.C. §371 of International Application No. PCT/JP2012/004778, filed on Jul. 26, 2012, which in turn claims the benefit of Japanese Application No. 2011-166588, filed on Jul. 29, 2011, the disclosures of which Applications are incorporated by reference herein.

TECHNICAL FIELD

The present invention relates to a battery retainment block, and a battery module having such a battery retainment block.

BACKGROUND ART

Conventionally, for instance, known is a battery module including a plurality of batteries for use as a motor drive power source of an electric vehicle. With this battery module, a plurality of batteries are retained, for instance, by being respectively stored in a plurality of batteries retaining units provided to the battery retainment block. With this kind of battery module, since the plurality of batteries generate heat during their use, the generated heat is preferably radiated in order to protect the batteries.

A type capable of radiating the generated heat of batteries stored in a battery retaining unit in a battery retainment block is disclosed, for instance, in Patent Document 1. The battery retainment block disclosed in Patent Document 1 comprises a plurality of block pieces (heat transfer cylinders) which retain a plurality of batteries in a state where the batteries are arranged in two rows. A part of the block piece is configured as a thermal runaway prevention wall, and the thermal runaway prevention wall is provided along the entire axial direction of the battery between two batteries that are adjacent to each other among the plurality of batteries that are retained. The battery retainment block is provided with an opening at either side across the thermal runaway prevention wall in which a part of the block piece is opened. By causing a part of the periphery of the battery to be exposed from that opening, cooling air can be applied to that location.

In the battery retainment block disclosed in Patent Document 1, the thermal runaway prevention wall is provided across the entire axial direction of the battery between two adjacent batteries. Thus, it is difficult to apply cooling air between the two adjacent batteries. Accordingly, with the battery retainment block disclosed in Patent Document 1, there is a problem in that the heat generation of the respective batteries cannot be efficiently and sufficiently radiated with cooling air.

Patent Document 1: Japanese Patent Application Publication No. 2007-66773

SUMMARY OF THE INVENTION

An object of the present invention is to provide a battery retainment block and a battery module capable of efficiently and sufficiently radiating the heat generation of the retained battery.

The battery retainment block according to one aspect of the present invention comprises a plurality of block pieces formed in a shape for retaining a battery, wherein the plurality of block pieces are arranged, and the two block pieces that are adjacent to each other, among the plurality of block pieces, are coupled together, and wherein a circulation space for circulating a medium is provided between the two block pieces that are adjacent to each other.

Moreover, the battery module according to another aspect of the present invention comprises the battery retainment block, and a battery stored in the battery retainment block.

EMBODIMENTS FOR CARRYING OUT THE INVENTION

Embodiments of the present invention are now explained in detail with reference to the drawings.

Figure 1A:
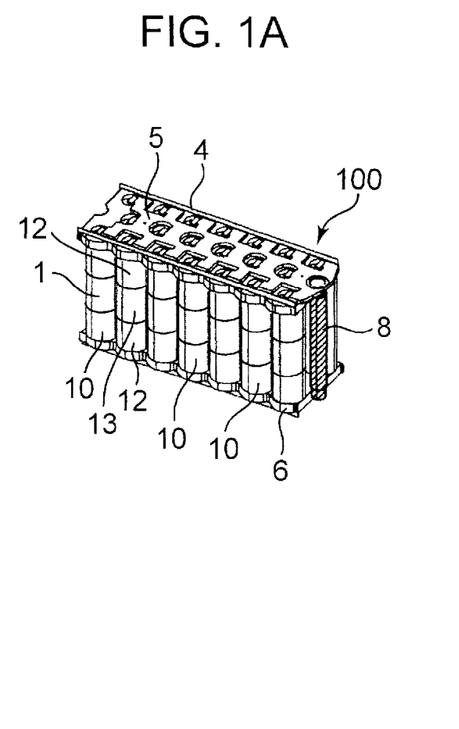
FIG. 1A is a perspective view of the battery module including battery retainment blocks as an embodiment of the present invention.
Figure 1B:
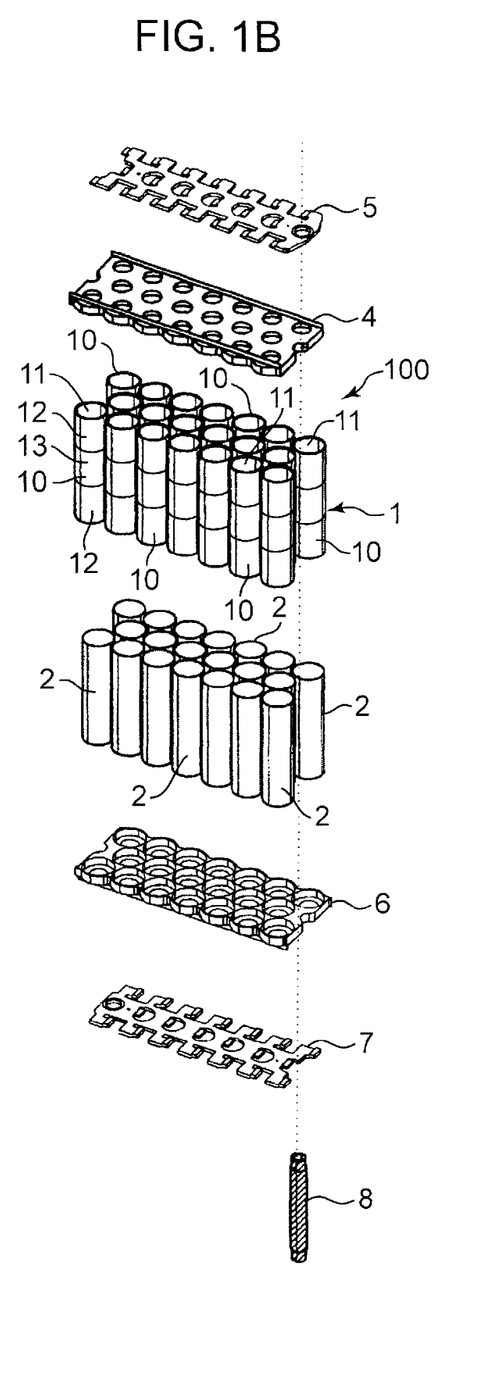
FIG. 1B is an exploded perspective view of the battery module.
Figure 2A:
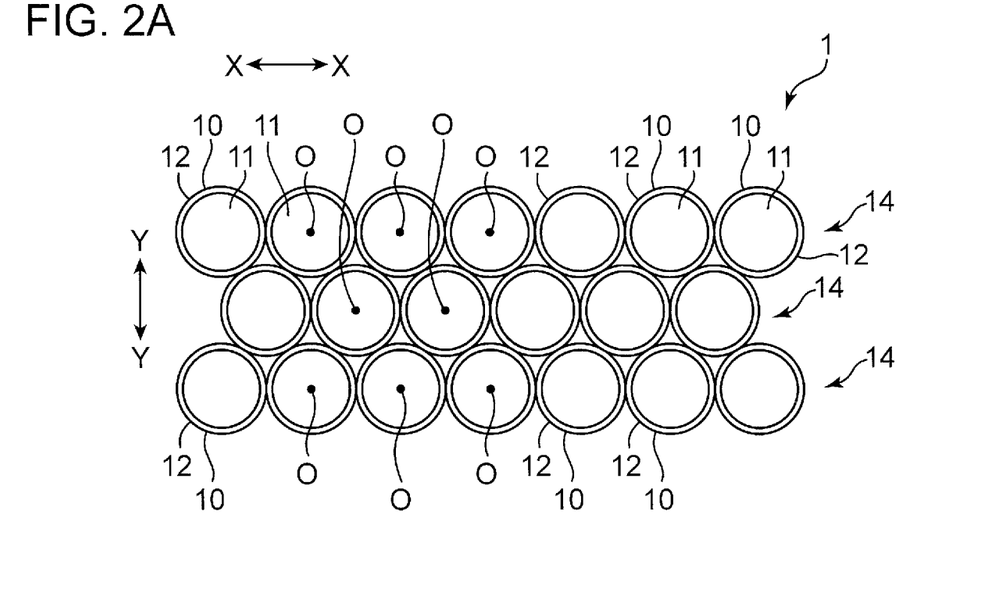
FIG. 2A is a plan view of the battery retainment blocks.
Figure 2B:
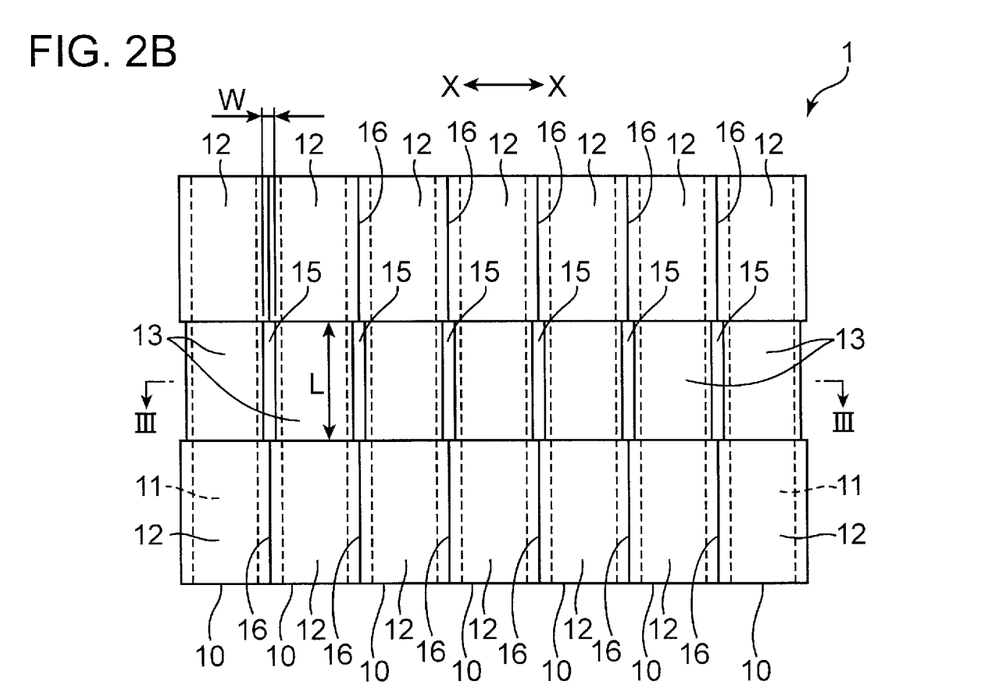
FIG. 2B is a side view of the battery retainment blocks.

FIG. 1A is a perspective view of the battery module including battery retainment blocks as an embodiment of the present invention, and FIG. 1B is an exploded perspective view of the battery module. FIG. 2A is a plan view of the battery retainment blocks, and FIG. 2B is a side view of the battery retainment blocks.

The battery module 100 of this embodiment is used, for instance, as a motor drive power source of an electric vehicle. The battery module 100 comprises a battery retainment block 1, a plurality of (twenty in this example) batteries 2 retained in the battery retainment block 1, a positive electrode-side holder 4, a positive plate 5, a negative electrode-side holder 6, and a negative plate 7.

The battery retainment block 1 comprises a plurality of (twenty in this example) cylindrical block pieces 10. In this embodiment, each block piece 10 is configured from aluminum or aluminum alloy. Note that the block pieces 10 are not limited to being configured from aluminum or aluminum alloy, and may also be configured, for instance, from metal, preferably metal having superior heat radiation performance.

With each block piece 10, the length in the axial direction is substantially the same as the axial direction length of the battery 2, and a storage unit 11 for retaining the battery 2 is provided internally. The inner diameter of the storage unit 11 is set to be substantially equal to the outer diameter of the battery 2.

Each block piece 10 of this embodiment comprises, as shown in FIG. 2B, a large diameter part 12 as a convex part and a small diameter part 13 as a concave part. The large diameter part 12 is disposed at each end in the axial direction, and the small diameter part 13 is disposed between the large diameter parts 12. The small diameter part 13 is formed to have a circular cross section shape of a diameter that is smaller than the large diameter part 12. To put it differently, in each block piece 10, both ends in the axial direction are convex parts, and the portion (small diameter part 13) between both convex parts is formed as a concave part having an outer peripheral face that is more recessed than the outer peripheral face of the convex part. To put it differently, the outer face of the large diameter part 12 is protruding more in the radial direction than the outer face of the small diameter part 13. Note that the inner peripheral face of the large diameter part 12 and the inner peripheral face of the small diameter part 13 are flush. Thus, the thickness of the large diameter part 12 is greater than the thickness of the small diameter part 13.

In this embodiment, each block piece 10 is formed by wind-forming a single plate-shaped body 10*a* having a thick plate part 12*a* and a thin plate part 13*a*.

Figure 4A:
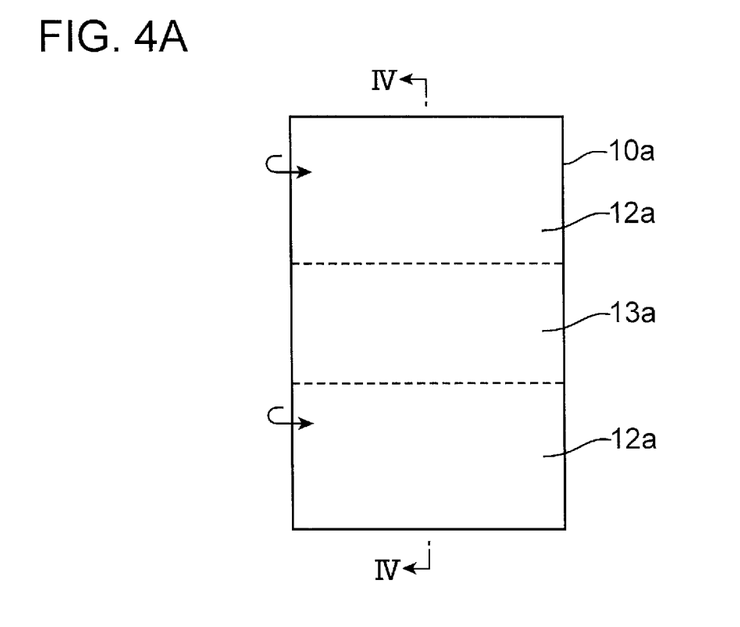
FIG. 4A is a development view of a block piece.
Figure 4B:
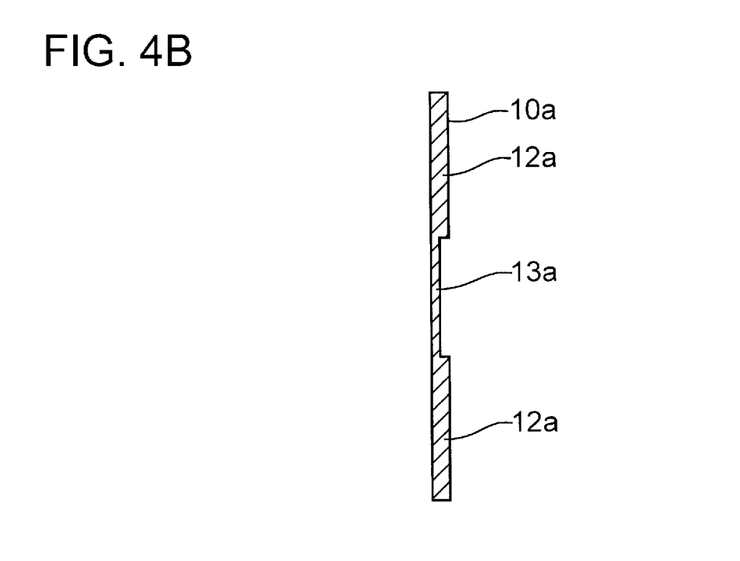
FIG. 4B is a cross section along line IV-IV of FIG. 4A.

Specifically, the plate-shaped body 10*a* comprises, as shown in FIG. 4A and FIG. 4B, a thick plate part 12*a* disposed at either end in a direction (up-down direction in the diagram) to become the axial direction, and a thin plate part 13*a*, in which the plate thickness is thinner than the thick plate part 12*a*, provided between the thick plate parts 12*a*. One principal surface (principal surface on the left side of FIG. 4B) of the plate-shaped body 10*a* is formed as a flat surface. Meanwhile, the other principal surface (principal surface on the right side of FIG. 4B) is formed so that the thick plate part 12*a* protrudes more than the thin plate part 13*a* in a step-wise manner.

In addition, the plate-shaped body 10*a* is wound in the left-right direction of FIG. 4A to form a circular cross section in a state where the one principal surface becomes the inner surface and the other principal surface becomes the outer surface, and both left and right ends of the plate-shaped body 10*a* are mutually coupled. Here, both left and right ends of the thick plate part 12*a* are mutually coupled, and both left and right ends of the thin plate part 13*a* are also mutually coupled. A block piece 10 having the large diameter part 12 formed from the thick plate part 12*a* and the small diameter part 13 formed from the thin plate part 13*a* is thereby formed.

The plurality of (seven or six in this embodiment) block pieces 10 are aligned in one row along a first direction (X-X direction which is the left-right direction in the diagram) as shown in FIG. 2A and FIG. 2B, and thereby form a first direction row 14. In this state, the large diameter parts 12 of the two adjacent block pieces 10 face each other, and the small diameter parts 13 also face each other. Moreover, with the two adjacent block pieces 10, the axes O thereof are mutually parallel.

At least three (three in this embodiment) of such first direction rows 14 formed as described above are formed, and these first direction rows 14 are disposed so that they are aligned in a second direction (Y-Y direction) that intersects with the first direction. In this embodiment, the first direction and the second direction are of an orthogonal relation.

In this embodiment, the block pieces 10 are alternately disposed in the two adjacent first direction rows 14. In other words, when viewed in terms of the Y-Y direction, the axis O of the block piece 10 in one first direction row 14 is disposed at the substantial center between the axes O of the two adjacent block pieces 10 in the other first direction row 14, and the block pieces 10 are disposed in a so-called zigzag alignment.

The two adjacent block pieces 10 are mutually coupled. This coupled is performed as following in this embodiment.

A bonding material (brazing filler material) 16 made from a low melting point alloy, which has a lower melting point than the block piece 10, is disposed in advance on the outer peripheral face of the large diameter part 12 of the block piece 10 that was subject to wind-forming as described above.

In addition, twenty block pieces 10 are disposed in a zigzag alignment in a box not shown. Here, the block pieces 10 are set so that the large diameter parts 12 of the two adjacent block pieces 10 respectively come into contact with the bonding material 16.

The plurality of block pieces 10 set in the box are retained for a predetermined time under a temperature atmosphere that will melt the bonding material 16, and thereafter left as is, for instance, at room temperature. Consequently, the two adjacent block pieces 10 become fixed bonded at the large diameter parts 12 via the bonding material 16. Subsequently, the plurality of arranged block pieces 10 become mutually coupled.

Figure 3:
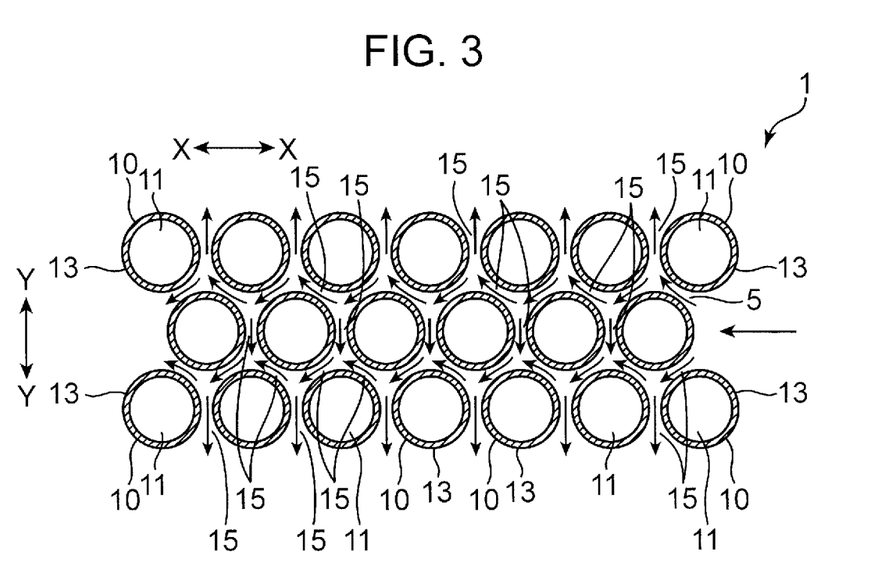
FIG. 3 is a cross section along line III-III of FIG. 2B.

In a state where the two adjacent block pieces 10 are mutually bonded, as shown in FIG. 2B and FIG. 3, a gap 15 as a circulation space is formed between the small diameter parts 13 of the block pieces 10 that are adjacent to each other. In other words, while one part (outer peripheral face of the large diameter part 12) of the outer peripheral face of the block piece 10 is bonded to the adjacent block piece 10, portions other than this bonded portion form the circulation space.

Note that, in this embodiment, the width W of the gap 15 is roughly 0.5 to 5 mm, and the length L of the gap 15 (length corresponding to the length of the small diameter part 13 in the axial direction) is set to be roughly 30 to 80% of the length (height of battery) of the battery 2 in the axial direction. The width W of the gap 15 as referred to herein means the distance between the outer peripheral faces of the adjacent small diameter parts 13. Note that the width W and the length L of the gap 15 are not limited to the above, and may be suitably changed. However, if the length L of the gap 15 becomes shorter than 30% of the length of the battery 2, the effect of cooling the block pieces 10 with the cooling air passing through the gap 15 will decrease. Meanwhile, if the length L of the gap 15 exceeds 80% of the length of the battery 2, there is concern that the efficiency of radiating the heat absorbed by the block piece 10 from the battery 2 will deteriorate. Accordingly, as described above, the length L of the gap 15 is preferably around 30 to 80% of the length of the battery 2.

Moreover, all gaps 15 as the circulation space formed as described above are in communication.

Returning to FIG. 1, in this embodiment, the batteries 2 are formed in a columnar shape having a diameter of approximately 18 mm and a length in the axial direction of approximately 65 mm Note that FIG. 1 shows a state where the upper part is the positive electrode (+electrode) and the lower part is the negative electrode (−electrode).

The batteries 2 are housed in the respective storage units 11 of the battery retainment block 1 so that the positive electrode faces upward and the negative electrode faces downward.

In this embodiment, the positive electrode-side holder 4 is mounted on one end side (upper end side of FIG. 1) of the battery retainment block 1. Note that the mounting of the positive electrode-side holder 4 on the battery retainment block 1 is performed after the batteries 2 are housed in the storage unit 11 of the block piece 10.

In this embodiment, the negative electrode-side holder 6 is mounted on the other end side (lower end side of FIG. 1) of the battery retainment block 1. Note that the mounting of the negative electrode-side holder 6 on the battery retainment block 1 is performed after the batteries 2 are housed in the storage unit 11 of the block piece 10.

The respective batteries 2 retained in the battery retainment block 1 are sandwiched by the positive electrode-side holder 4 and the negative electrode-side holder 6.

The positive plate 5 is electrically connected to the positive electrode of the respective batteries 2, and the negative plate 7 is electrically connected to the negative electrode of the respective batteries 2.

Figure 5A:
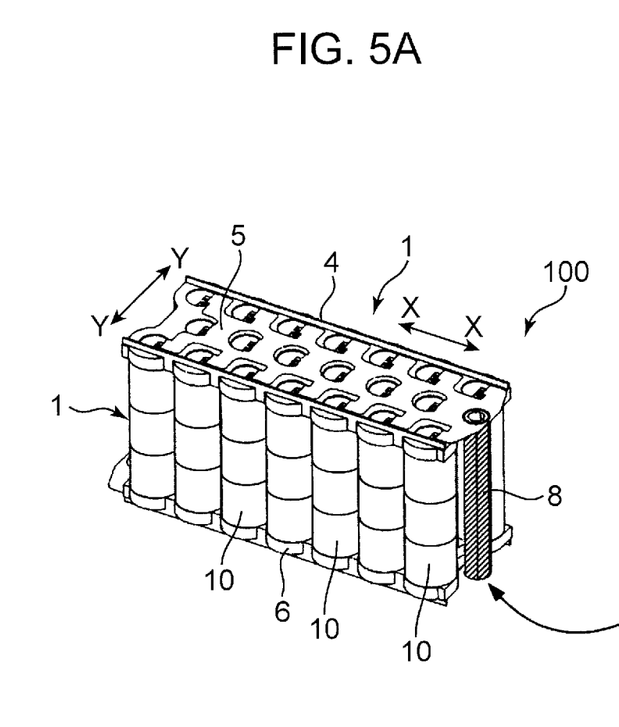
FIG. 5A and FIG. 5B are diagrams explaining the method of connecting a plurality of the battery modules.
Figure 5B:
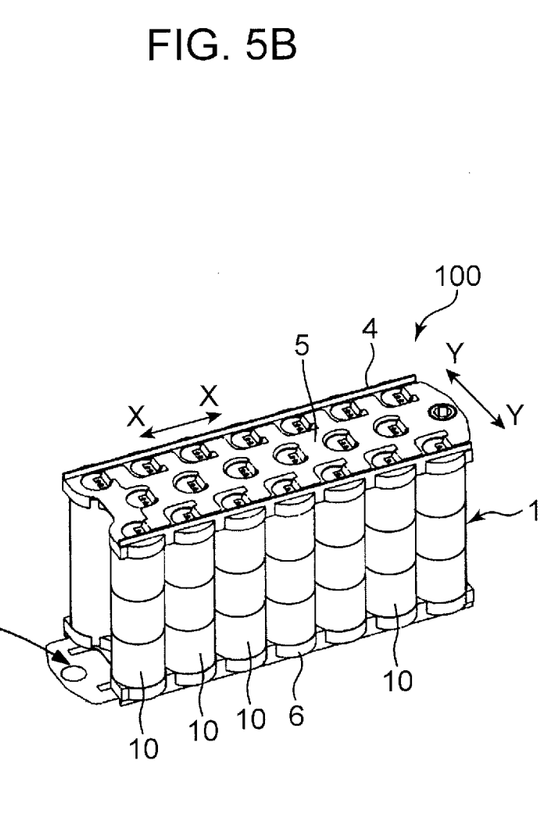

The battery module 100 configured as described above may be used independently, or used by being connected conductively with other battery modules 100. For example, as shown in FIG. 5, a bus bar 8 connected to an end of the positive plate 5 of one battery module 100 in the first direction (X-X direction) is connected to an end of the negative plate 7 of the other battery module 100 in the first direction. Consequently, a plurality of battery modules 100 are connected in series. For example, if the output voltage of one battery module 100 is 4 V, by connecting one hundred battery modules 100 in series, a 400 V battery module can be obtained. This battery module can be used as a motor drive power source of automobiles and the like.

Note that the connection of the battery modules 100 is not limited to the mode of connecting ends in the first direction, and may be suitably changed. For example, it is also possible to connect, in a conductive manner, one end of the bus bar 8 to the end of the positive plate 5 of one battery module 100 in the second direction (Y-Y direction), and connect, in a conductive manner, the other end of the bus bar 8 to the end of the negative plate 7 of the other battery module 100 in the second direction.

The battery module 100 configured as described above is used as a motor drive power source of automobiles and the like. While the batteries 2 will generate heat when used, since the block pieces 10 of the battery retainment block 1 are made from metal, the block pieces 10 can absorb and radiate the heat from the batteries 2.

The battery retainment block 1 is used, for example, in a state where cooling air as the cooling medium is applied from one end side (right end side of FIG. 3) by a medium blowing device not shown. Consequently, the cooling air is circulated to sequentially thread through the gaps 15 formed in the battery retainment block 1 as shown with the arrows in FIG. 3.

Accordingly, the entire periphery of the respective block pieces 10 can be efficiently cooled and sufficiently radiated.

Since the storage unit 11 of the respective block pieces 10 is disposed to substantially cover the entire outer periphery of the housed batteries 2, the batteries 2 can be protected individually.

Figure 6:
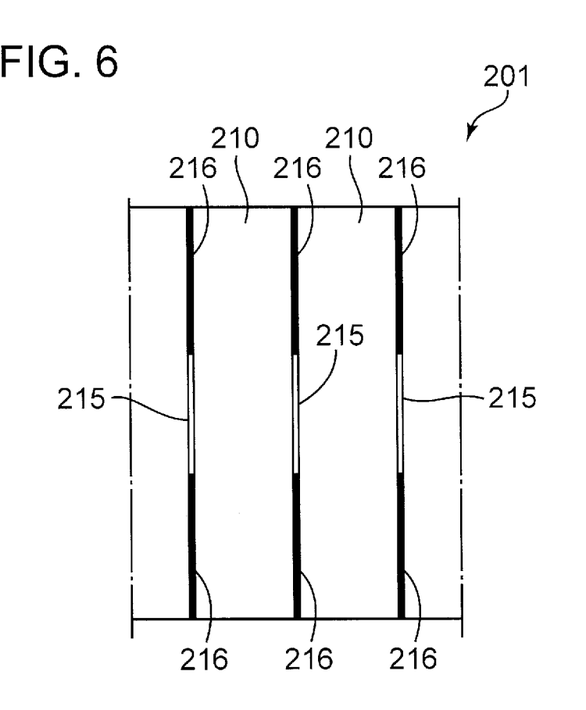
FIG. 6 is a side view of the main part of the battery retainment block as another embodiment of the present invention.

Note that, in the foregoing embodiment, while the block piece 10 was configured by including a large diameter part 12 and a small diameter part 13, the mode is not limited thereto, and may be suitably changed. For example, as shown in FIG. 6, it is also possible to adopt a configuration comprising block pieces 210 in which the outer diameter is the same across the entire axial direction. In the foregoing case, a bonding material 216 having a predetermined thickness and made from a low melting point alloy is disposed at either end of the block piece 210 in the axial direction. The bonding material 216 on one side and the bonding material 216 on the other side in the axial direction are mutually separated. Subsequently, as a result of the bonding materials 216 of the two adjacent block pieces 210 being bonded as described above, a gap 215 having a thickness in the amount of both bonding materials 216 is formed at the center part of the block piece 210 in the axial direction (portion between the separated bonding materials 216). Even with the battery retainment block 201 configured as described above, while the block pieces 210 that are adjacent to each other are mutually bonded via the bonding materials 216, the portions other than the bonded portion will form the gap 215.

Moreover, in the foregoing embodiment, while the bonding of the block pieces 10, 210 is performed via soldering using the bonding materials 16, 216, there is no particular limitation in the bonding means for coupling the block pieces. For example, the block pieces may be coupled with an adhesive or coupled via welding, and the method may be suitably changed. When coupling the block pieces via welding, for instance, the coupling process may be performed via laser welding.

Here, an example of the production method of the battery retainment block 1 having a configuration in which a plurality of block pieces 10 are coupled is explained with reference to FIG. 7A to FIG. 7D. This production method is an example of the production method in cases of bonding the adjacent block pieces 10 via a laser welding and, as shown in FIG. 7D, illustrates a case of producing a battery retainment block 1 in which three first direction rows 14 are formed.

Upon producing the battery retainment block 1, foremost, block pieces 10 in a number (three in this example) that is equivalent to the number of first direction rows 14 is prepared, and these block pieces 10 are arranged in a single row in a state where they are in contact with each other. Subsequently, in this state, the adjacent block pieces 10 are subject to laser welding. It is thereby possible to obtain single row pipes 22 in which three block pieces 10 are coupled (FIG. 7A and FIG. 7B).

Figures 7A, 7B, 7C:
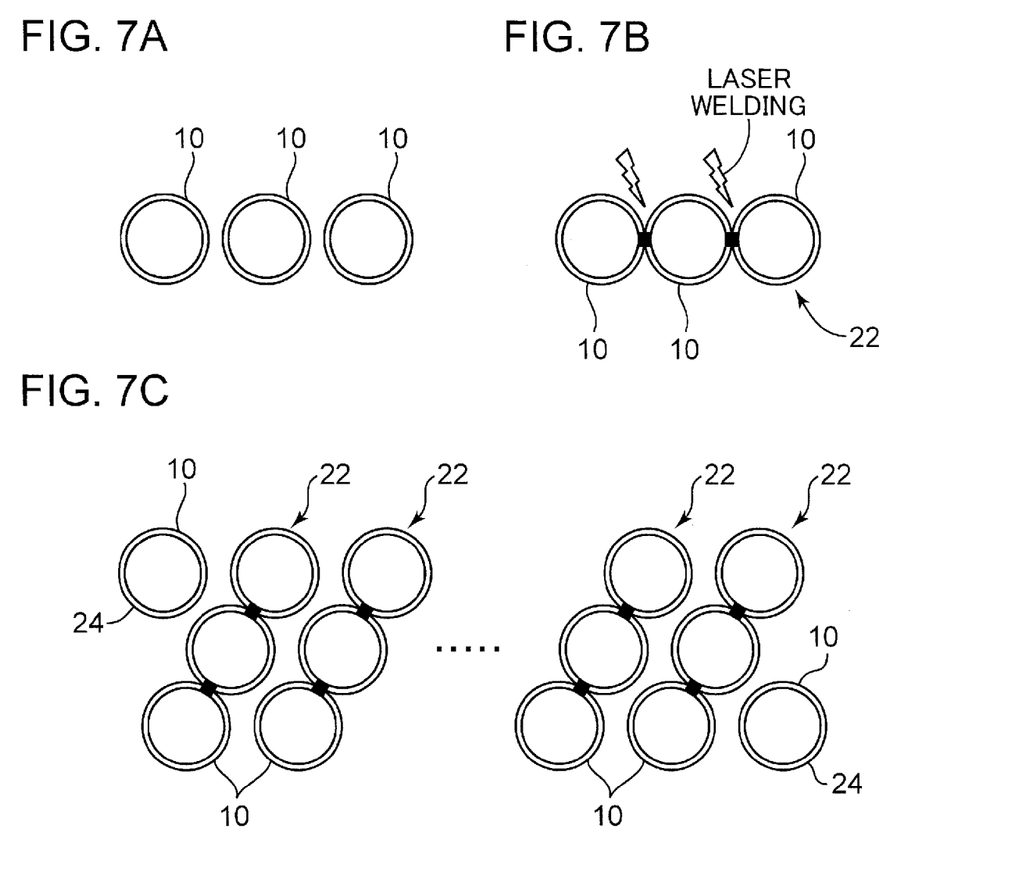
FIG. 7A to FIG. 7D are diagrams explaining an example of the production method of the battery retainment blocks.
Figure 7D:
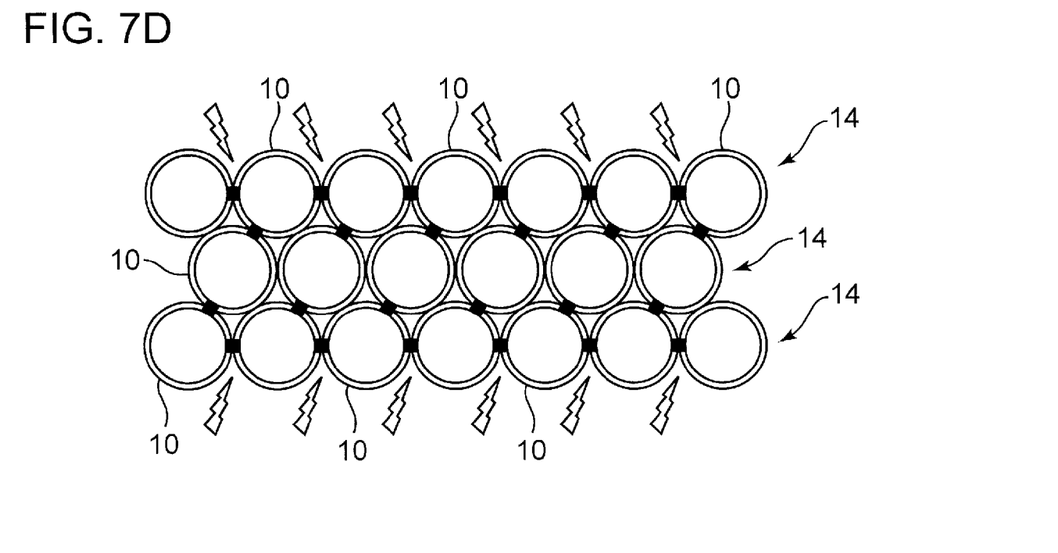

Subsequently, as shown in FIG. 7C, a plurality of (six in this example) single row pipes 22 and a plurality of (two in this example) single item pipes (block pieces 10) 24 are used, and the plurality of single row pipes 22 are arranged in the first direction so that the block pieces 10 become a zigzag arrangement and the adjacent single row pipes 22 come into contact with each other. In this state, while the three block pieces 10 that are adjacent in an oblique direction relative to the first direction are coupled, the block pieces 10 that are adjacent in the first direction are not yet coupled.

Subsequently, single item pipes (block pieces 10) 24 are respectively disposed at the opposing corners in the plurality of arranged block pieces 10. When all block pieces 10 configuring the battery retainment block 1 have been disposed as described above, as shown in FIG. 7D, laser welding is performed between the adjacent block pieces 10. In other words, the adjacent single row pipes 22 are bonded via laser welding, and the single row pipe 22 and the single item pipe 24 positioned at the ends are also bonded via laser welding. Consequently, all block pieces 10 are respectively fixed to the adjacent block piece 10.

Note that, for those in which a different number of block pieces 10 are aligned in the first direction row 14, a corresponding number of single row pipes 22 may be used. Moreover, when the number of block pieces 10 aligned in the second direction is other than three, the number of block pieces 10 configuring the single row pipes 22 may be changed accordingly.

Moreover, in the foregoing embodiment, while all block pieces 10 are configured to include a large diameter part 12 and a small diameter part 13, the mode is not limited thereto, and may be suitably changed. For example, it is also possible to adopt a configuration where one block piece of the two adjacent block pieces includes a large diameter part and a small diameter part, and the other block piece has an outer diameter that is the same across the entire length in the axial direction.

Moreover, in the foregoing embodiment, while the configuration was such that all gaps are of the same size and all gaps are provided at the same position of the block piece 10 in the axial direction, the mode is not limited thereto, and may be suitably changed. For example, one or more gaps may be of a size that is different from the other gaps, or one or more gaps may be provided at a position that is different from the other gaps; that is, at a different position of the block piece 10 in the axial direction.

However, since a battery generates more heat from the center part than either end in the axial direction, the gap is preferably disposed at the center part of the block piece 10 in the axial direction as with the foregoing embodiment.

Moreover, in the foregoing embodiment, while the configuration was such that the battery retainment block 1 includes three first direction rows 14, the mode is not limited thereto. For example, it is also possible to adopt a configuration where the battery retainment block 1 includes one, two, or four or more first direction rows 14.

Moreover, in the foregoing embodiment, while the configuration was such that the two adjacent first direction rows 14 are disposed in a zigzag arrangement, the mode is not limited thereto. For example, it is also possible to adopt a configuration where the axes O of the block pieces 10 in one row of the two adjacent first direction rows 14 and the axes O of the block pieces 10 of the other row are disposed to be aligned in the second direction.

Moreover, in the foregoing embodiment, while the block pieces 10, 210 are formed in a cylindrical shape, the mode is not limited thereto. For example, the block pieces may also be formed such that the outer peripheral shape thereof is of a multiangular tubular shape.

Moreover, in the foregoing embodiment, while air (cooling air) was used as the medium to circulate in the circulation space for cooling the block pieces 10, 210, the mode is not limited thereto. For example, it is also possible to adopt a configuration of circulating a liquid cooling medium in the circulation space.

The battery module is not limited to use as a motor drive source of an electric vehicle, and may also be used as the drive source of various types of equipment.

The embodiment explained above can be summarized as follows.

(1) The battery retainment block of the embodiment comprises a plurality of block pieces formed in a shape for retaining a battery, wherein the plurality of block pieces are arranged, and the two block pieces that are adjacent to each other, among the plurality of block pieces, are coupled together, and wherein a circulation space for circulating a medium is provided between the two block pieces that are adjacent to each other.

With this battery retainment block, among the plurality of block pieces that are arranged, a circulation space for circulating a medium is provided between the two block pieces that are adjacent to each other. Thus, by applying a medium such as cooling air into the circulation space from one end of the circulation space, the cooling air can be circulated in the respective circulation spaces. It is thereby possible to cool the outer periphery of the respective block pieces substantially across the entire peripheral direction. Accordingly, the heat generation of the battery can be efficiently and sufficiently radiated.

(2) At least one of the two block pieces that are adjacent to each other may include a convex part, and a concave part having an outer peripheral face which is more recessed than an outer peripheral part of the convex part, and, in the foregoing case, the convex part may be coupled to the other one of the two block pieces that are adjacent to each other, and a gap may be formed as the circulation space between the concave part and the other block piece.

In this mode, block pieces having a convex part and a concave part on the outer periphery thereof are used, and the convex part of one of the two block pieces that are adjacent to each other is coupled to the other block piece. Accordingly, a gap as the circulation space can be easily and reliably formed between the concave part of one block piece and the other block piece. Accordingly, a battery retainment block with a circulation space can be easily formed.

(3) At least one of the two block pieces that are adjacent to each other may be formed in a cylindrical shape, and has a large diameter part, and a small diameter part having a diameter that is smaller than the large diameter part, and, in the foregoing case, the large diameter part may be coupled to the other one of the two block pieces that are adjacent to each other, and a gap may be formed as the circulation space between the small diameter part and the other block piece.

In this mode, block pieces comprising a large diameter part and a small diameter part are used, and the large diameter part of one of the two block pieces that are adjacent to each other is coupled to the other block piece. Accordingly, a gap as the circulation space can be easily and reliably formed between the small diameter part of one block piece and the other block piece. Accordingly, a battery retainment block with a circulation space can be easily formed.

(4) The circulation space may be disposed at a center part of the block piece in an axial direction. The heat generation of a battery occurs more at the center part than either end in the axial direction. By adopting a configuration where the circulation space is disposed at the center part of the block piece in the axial direction, the heat generation of a battery can be cooled more efficiently.

(5) A length of the block piece in the axial direction in the circulation space may be 30 to 80% of a height of the battery.

According to this mode, in addition to being able to cool the block pieces even more efficiently, the heat of the block pieces absorbed from the battery can be efficiently and sufficiently radiated.

(6) At least three first direction rows each having a plurality of block pieces arranged in a row along a first direction may be formed, and, in the foregoing case, the at least three first direction rows may be arranged along a second direction that intersects with the first direction, and a block piece of one of the adjacent two first direction rows and a block piece of the other one of the adjacent two first direction rows may be disposed alternately.

In this mode, the gap between the two first direction rows that are adjacent to each other can be decreased. Accordingly, the length of the battery retainment block in the second direction can be shortened, and the battery retainment block can be downsized. Moreover, even when the gap between the two first direction rows that are adjacent to each other is decreased based on the circulation space formed between the block pieces of the two first direction rows that are adjacent to each other, the heat generation of the battery can be efficiently and sufficiently radiated since the outer periphery of the respective block pieces can be cooled substantially across the entire periphery thereof.

(7) The battery module of this embodiment comprises the foregoing battery retainment block, and a battery retained in the battery retainment block.

With this battery module, by applying from one end of the module a medium such as cooling air into the circulation space formed between the two block pieces that are adjacent to each other, the cooling air can be circulated in the respective circulation spaces. It is thereby possible to cool the outer periphery of the respective block pieces substantially across the entire peripheral direction. Accordingly, the heat generation of the battery can be efficiently and sufficiently radiated.

INDUSTRIAL APPLICABILITY

The present invention is useful as a battery retainment block, and a battery module comprising such a battery retainment block.

EXPLANATION OF REFERENCE NUMERALS

1 battery retainment block
2 battery
4 positive electrode-side holder
5 positive plate
6 negative electrode-side holder
7 negative plate
10 block piece
11 battery storage unit
12 large diameter part (convex part)
13 small diameter part (concave part)
15 gap (circulation space)
100 battery module

The invention claimed is:

1. A battery retainment block, comprising:
a plurality of block pieces formed in a shape for retaining a battery, wherein
the plurality of block pieces are arranged, and at least one of the two block pieces that are adjacent to each other, among the plurality of block pieces, includes a convex part, and a concave part having an outer peripheral face which is more recessed than an outer peripheral part of the convex part,
wherein an inner peripheral face of the convex part and an inner peripheral face of the concave part are flush, the inner peripheral face of the convex part and the inner peripheral face of the concave part facing an outer face of a battery when the battery is retained in the block piece,
the convex part is coupled to the other one of the two block pieces that are adjacent to each other, and
a circulation space for circulating a medium is provided between the concave part and the other one of the two block pieces.

2. The battery retainment block according to claim 1, wherein
at least one of the two block pieces that are adjacent to each other is formed in a cylindrical shape,
the convex part is formed by a large diameter part, the concave part is formed by a small diameter part having a diameter that is smaller than the large diameter part,
the large diameter part is coupled to the other one of the two block pieces that are adjacent to each other, and
a gap is formed as the circulation space between the small diameter part and the other one of the block pieces.

3. The battery retainment block according to claim 1, wherein the circulation space is disposed at a center part of the block piece in an axial direction.

4. The battery retainment block according to claim 3, wherein a length of the circulation space in the axial direction of the block piece is 30 to 80% of a length of the battery.

5. The battery retainment block according to claim 1, wherein
at least three first direction rows each having a plurality of block pieces arranged in a row along a first direction are formed,
the at least three first direction rows are arranged in a second direction that intersects with the first direction, and
a block piece of one of the adjacent two first direction rows and a block piece of the other one of the adjacent two first direction rows are disposed alternately.

6. A battery module, comprising:
the battery retainment block according to claim 1; and
a battery retained in the battery retainment block.

\* \* \* \* \*